US008646069B2

(12) United States Patent
Kim et al.

(10) Patent No.: US 8,646,069 B2
(45) Date of Patent: Feb. 4, 2014

(54) SECURITY APPARATUS FOR COMPUTER SYSTEM AND METHOD THEREOF

(75) Inventors: Myoung-ho Kim, Hwaseong-gu (KR); Kwang-yong Lee, Suwon-si (KR); Shung-hyun Cho, Seoul (KR); Tae-soo Kim, Seoul (KR); Sang-jin Lee, Suwon-si (KR); Cheon-moo Lee, Yongin-si (KR); Eun-kyung Kim, Seongnam-si (KR); Su-young Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1840 days.

(21) Appl. No.: 11/689,841

(22) Filed: Mar. 22, 2007

(65) Prior Publication Data

US 2008/0010679 A1 Jan. 10, 2008

(30) Foreign Application Priority Data

Jul. 5, 2006 (KR) .................. 10-2006-0063150

(51) Int. Cl.
*H04L 29/06* (2006.01)

(52) U.S. Cl.
USPC .......................................... 726/20

(58) Field of Classification Search
USPC .................................... 726/19, 20
See application file for complete search history.

(56) References Cited

U.S. PATENT DOCUMENTS

| 6,647,497 | B1 * | 11/2003 | Cromer et al. ............... 726/16 |
| 7,210,166 | B2 * | 4/2007 | Davis et al. ................. 726/6 |
| 7,337,323 | B2 * | 2/2008 | Cochran et al. ............. 713/182 |
| 7,492,258 | B1 * | 2/2009 | Shoarinejad et al. ....... 340/572.1 |
| 7,493,388 | B2 * | 2/2009 | Wen et al. .................. 709/224 |
| 7,509,686 | B2 * | 3/2009 | Checco ....................... 726/27 |
| 7,603,710 | B2 * | 10/2009 | Harvey et al. ............... 726/23 |
| 7,634,801 | B2 * | 12/2009 | Kizawa ....................... 726/4 |
| 7,778,606 | B2 * | 8/2010 | Ammon et al. ............ 455/67.11 |
| 2002/0073306 | A1 * | 6/2002 | Aluzzo et al. ............... 713/1 |
| 2003/0070079 | A1 * | 4/2003 | Cromer et al. .............. 713/186 |
| 2003/0217289 | A1 * | 11/2003 | Ammon et al. .............. 713/201 |
| 2004/0059907 | A1 * | 3/2004 | Cochran et al. .............. 713/2 |
| 2004/0187037 | A1 * | 9/2004 | Checco ....................... 713/202 |
| 2004/0198392 | A1 * | 10/2004 | Harvey et al. ............ 455/456.1 |
| 2004/0252837 | A1 * | 12/2004 | Harvey et al. ............... 380/270 |
| 2005/0071665 | A1 * | 3/2005 | Zimmer et al. ............... 713/200 |

(Continued)

FOREIGN PATENT DOCUMENTS

JP 2003-150455 5/2003
JP 2004-78539 3/2004

(Continued)

OTHER PUBLICATIONS

Office Action issued in corresponding Korean Patent Application No. 2006-63150 dated Oct. 25, 2007.

*Primary Examiner* — Michael S McNally (74) *Attorney, Agent, or Firm* — Jefferson IP Law, LLP (57) ABSTRACT

A computer system security apparatus and a security method thereof, the apparatus including a recognition unit to recognize identification information of a user; an operation unit to produce a result value by executing a predetermined operation on the identification information of the user and unique identification information of the computer system; and a main control unit to execute a booting of the computer system according to whether a preset password of the computer system and the result value are the same.

36 Claims, 7 Drawing Sheets

(56) References Cited

U.S. PATENT DOCUMENTS

| | | | |
|---|---|---|---|
| 2005/0081071 A1* | 4/2005 | Huang et al. | 713/300 |
| 2006/0064619 A1* | 3/2006 | Wen et al. | 714/734 |
| 2006/0085845 A1* | 4/2006 | Davis et al. | 726/6 |
| 2006/0129415 A1* | 6/2006 | Thukral et al. | 705/1 |
| 2007/0180485 A1* | 8/2007 | Dua | 725/114 |
| 2007/0262134 A1* | 11/2007 | Humphrey et al. | 235/379 |
| 2009/0084862 A1* | 4/2009 | McCallum | 238/12 |
| 2009/0085724 A1* | 4/2009 | Naressi et al. | 340/10.6 |
| 2009/0115573 A1* | 5/2009 | Naressi et al. | 340/10.1 |
| 2009/0296598 A1* | 12/2009 | Harvey et al. | 370/252 |
| 2009/0300763 A1* | 12/2009 | Harvey et al. | 726/23 |
| 2009/0315670 A1* | 12/2009 | Naressi et al. | 340/5.8 |

FOREIGN PATENT DOCUMENTS

| | | |
|---|---|---|
| KR | 2003-41658 | 5/2003 |
| KR | 2005-114859 | 12/2005 |
| KR | 2006-14654 | 2/2006 |

* cited by examiner

SECURITY APPARATUS FOR COMPUTER SYSTEM AND METHOD THEREOF

CROSS-REFERENCE TO RELATED APPLICATION

This application claims the benefit of Korean Application No. 2006-63150, filed Jul. 5, 2006 in the Korean Intellectual Property Office, the disclosure of which is incorporated herein by reference.

BACKGROUND OF THE INVENTION

1. Field of the Invention

Aspects of the present invention relate to a computer-security apparatus and method thereof. More particularly, aspects of the present invention relate to a computer-security apparatus and a method thereof, in which data stored in hardware and a hard disk drive cannot be used by an unauthorized user even when a computer is stolen.

2. Description of the Related Art

Figure 1:
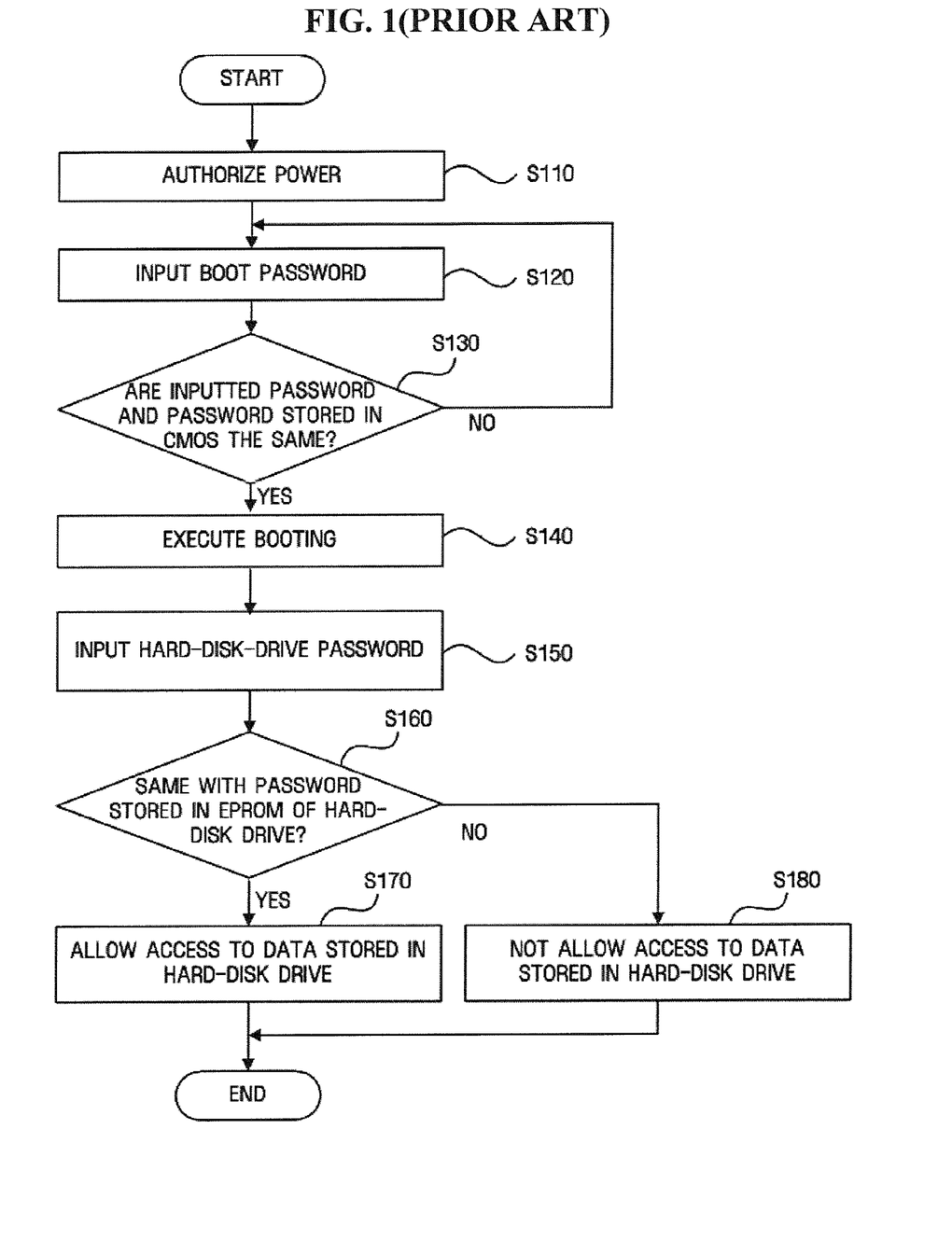
FIG. 1 is a flow chart illustrating a computer-security method according to the conventional art.

As the number of people using personal computers (such as a desktop computers and laptop computers) rapidly increases, there is a need for a security apparatus that protects the computer in a situation where the computer is stolen. FIG. 1 is a flow chart illustrating a conventional computer-security method. Specifically, FIG. 1 illustrates a computer-security method where a password is inputted in the booting step, and a method where a password is set in a hard disk drive. Initially, a user sets a boot password necessary for booting the computer. The boot password set by the user is stored in the CMOS. Further, the user can set a password in a hard disk drive. The password for the hard disk drive is stored in a memory included in the hard disk drive.

Where a password is set for booting and in the hard disk drive, if the power is authorized to the computer (operation S110), the computer receives an input of the boot password (operation S120) and compares the password stored in the CMOS with the inputted boot password (operation S130). If the two passwords are not the same (no in operation S130), the booting process does not progress until the password corresponding to the already-stored password is inputted. If the two passwords are the same (yes in operation S130), the booting process continues (operation S140).

Further, after the computer booting is completed, in the case where a user wants to access data stored in the hard disk drive, the user must input a password for the hard disk drive (operation S150). Here, the access to the hard disk drive is allowed (operation S170) only when the password inputted by the user and the preset hard-disk-drive password are the same (yes in operation S160).

However, according to the conventional art, the user must input the password whenever the computer is booted. As a result, when the computer is stolen, anyone can use the hard disk drive of the computer by removing the CMOS battery. Furthermore, even though a password is set for the computer, if the password-set hard disk drive is changed, anyone can use the hardware of the computer without knowing the password.

SUMMARY OF THE INVENTION

Aspects of the present invention include a computer-system security apparatus and a method thereof, in which a user does not need to input a password repeatedly whenever a computer is booted, and data stored in hardware and a hard disk drive of the computer cannot be used by an unauthorized user.

Additional aspects and/or advantages of the invention will be set forth in part in the description which follows and, in part, will be obvious from the description, or may be learned by practice of the invention.

According to an aspect of the present invention, there is provided a computer system security apparatus including: a recognition unit to recognize identification information of a user; an operation unit to produce a result value by executing a predetermined operation on the identification information of the user and unique identification information of the computer system; and a main control unit to execute a booting of the computer system according to whether a preset password of the computer system and the result value are the same.

According to another aspect of the present invention, there is provided a computer system security method including: recognizing identification information of a user; producing a result value by executing a predetermined operation on the identification information of the user and unique identification information of the computer system; and executing a booting of the computer system according to whether a preset password of the computer system and the result value are the same.

According to yet another aspect of the present invention, there is provided a computer system security apparatus including: a recognition unit to recognize identification information of a user; an operation unit to produce a result value by executing a predetermined operation on the identification information of the user and an other value; and a main control unit to determine whether the user is an allowed user according to whether a preset password and the result value are the same.

According to still another aspect of the present invention, there is provided a computer system security method including: recognizing identification information of a user; producing a result value by executing a predetermined operation on the identification information of the user and an other value; and determining whether the user is an allowed user according to whether a preset password and the result value are the same.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Aspects of the present invention are described hereinafter with reference to flowchart illustrations of user interfaces, methods, and computer program products according to embodiments of the invention. It should be understood that each block of the flowchart illustrations, and combinations of blocks in the flowchart illustrations can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create devices and/or methods to implement the functions specified in the flowchart block or blocks.

These computer program instructions may also be stored in a computer-usable or computer-readable memory that can direct a computer, a collection of computers, or other programmable data processing apparatus to function in a particular manner, such that the instructions stored in the computer-usable or computer-readable memory produce an article of manufacture including instruction methods that implement the function specified in the flowchart block or blocks.

The computer program instructions may also be loaded into a computer or other programmable data processing apparatus to cause a series of operations to be performed in the computer or other programmable apparatus to produce a computer-implemented process such that the instructions that execute in the computer or other programmable apparatus provide operations to implement the functions specified in the flowchart block or blocks.

And each block of the flowchart illustrations may represent a module, segment, or portion of code, which includes one or more executable instructions to implement the specified logical function(s). It should also be noted that in some alternative implementations, the functions noted in the blocks may occur out of order. For example, two blocks shown in succession may in fact be executed substantially concurrently or the blocks may sometimes be executed in reverse order depending upon the functionality involved.

Figure 2:
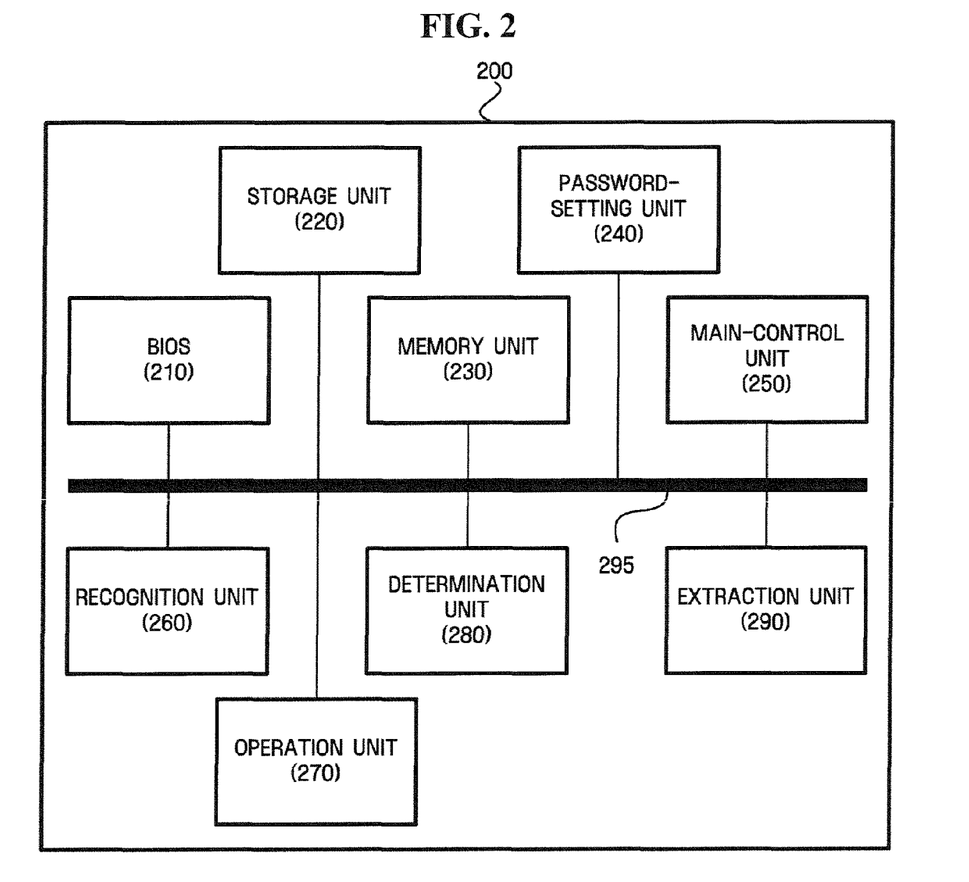
FIG. 2 is a block diagram illustrating the structure of a computer system according to an embodiment of the present invention.

FIG. 2 is a block diagram illustrating the structure of a computer system 200 according to an embodiment of the present invention. Referring to FIG. 2, the computer system 200 according to an embodiment of the present invention includes a basic input output system (BIOS) 210, a storage unit 220, a memory unit 230, a password-setting unit 240, a main control unit 250, a recognition unit 260, an extraction unit 290, an operation unit 270, and a determination unit 280. The shown units 210, 220, 230, 240, 250, 260, 270, 280, 290 are interconnected using a bus 295.

The BIOS 210 is automatically executed when the computer system 200 is turned on, examines the state of the computer system 200 (which is called a power-on self test (POST)), initializes the computer system 200, and confirms what peripheral devices (not shown) are connected to the computer system 200 during the initialization.

The storage medium 220, which stores large quantities of data, is a peripheral apparatus of the computer system 200. Some examples of the storage medium 200 are a CD-ROM, DVD-ROM, a rewritable and recordable CD/DVD, a Blu-Ray disc, USB storage medium, and hard disk drive. The case where the storage medium 200 is a hard disk drive will be illustrated in the following descriptions. However, it is understood that aspects of the present invention can be applied not only to a hard disk drive, but to other storage media as well. It is further understood that the storage medium 220 need not be detachable in all aspects, such as in an internal drive.

The hard disk drive 220 can include a first storage medium and a second storage medium. It is understood that the hard disk drive 220 can be partitioned into more or less than two storage media. Here, the first storage medium stores the operating system and user data, and the second storage medium stores unique information of the hard disk drive (e.g., a serial number and a hard disk drive password). Alternately, the second storage medium can be implemented as an EPROM, EEPROM, and others, but is not limited thereto.

The memory unit 230 stores a boot password of the computer system 200 set by the password-setting unit 240. For this, the memory unit 230 can be implemented as a nonvolatile memory element such as a flash memory, but is not limited thereto.

In the case where the boot password of the computer system 200 and the password of the hard disk drive 220 are not set, the password-setting unit 240 sets a result value produced by the operation unit 270 as the boot password of the computer system 200 and the password of the hard disk drive. Here, the boot password of the computer system 200 is stored in the afore-mentioned memory unit 230, and the password of the hard disk is stored in the, for example, second storage medium included in the hard disk drive 220.

The main control unit 250 connects and manages the components of the computer system 200. The computer system 200 boots according to whether the result value produced by the operation unit 270 and the preset boot password of the computer system 200 are the same. Specifically, in the case where the result value produced by the operation unit 270 and the boot password of the computer system 200 are the same, the main control unit 250 controls the computer system 200 to boot successfully. In the case where the result value produced by the operation unit 270 and the preset boot password are not the same, the main control unit 250 prevents the computer system 200 from booting.

The recognition unit 260 recognizes the user identification information. The user identification information refers to unique information of a user that uses the computer system 200. Some examples of the identification information are a fingerprint, an iris, and a face of a user. Other examples can include sound/voice of the user or other detectable indicia provided on a foreign object (such as the user or a card used by the user) that can identify the user. For the identification information recognition of the user, the recognition unit 260 can include one of a fingerprint-recognition module, an iris-recognition module, and a face-recognition module, although not limited thereto. Further, radio frequency identification (RFID) technology can be used for the input of user identification information. The recognition of the user identification information using RFID technology is described as follows.

RFID refers to a technology that transmits and receives information using radio frequencies to and from an electronic tag attached to an object, and provides services related to such information. The RFID is a representative technology of a contactless card that substitutes, for example, a bar code, a magnetic card, and an IC card. In order to receive the input of user identification information through such an RFID technology, the recognition unit 260 can include an RFID reader as shown in FIG. 4.

Figure 3:
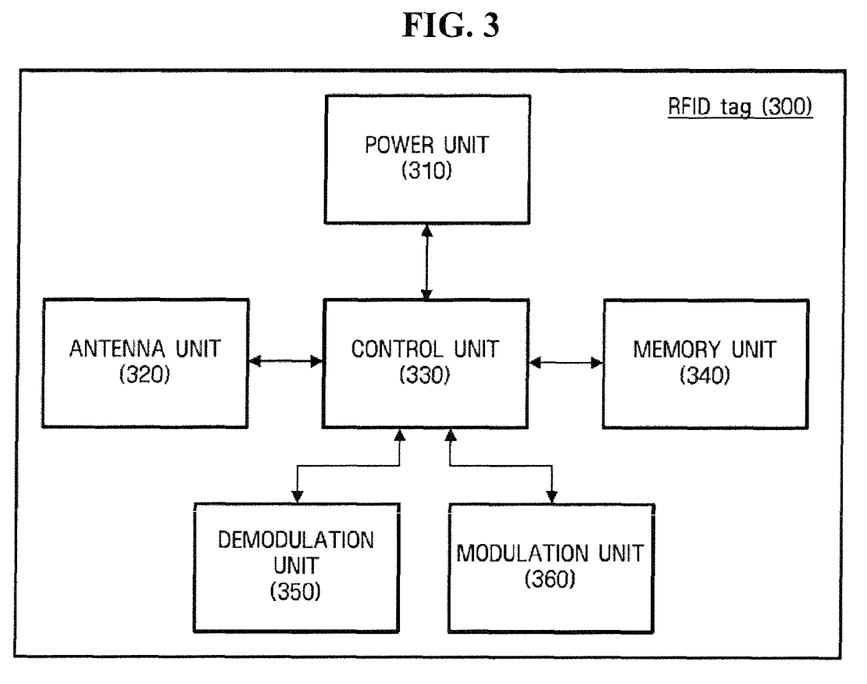
FIG. 3 is a block diagram illustrating the structure of a radio frequency identification (RFID) applied to the computer system of FIG. 2.
Figure 4:
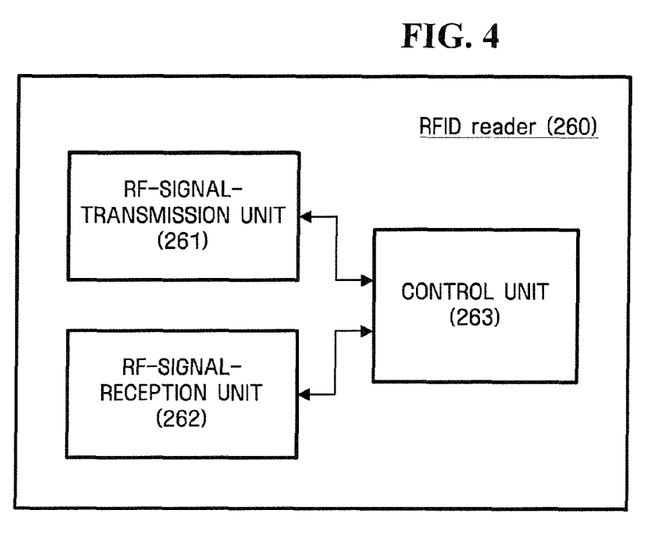
FIG. 4 is a block diagram illustrating the structure of an RFID reader applied to the computer system of FIG. 2.

The RFID reader 260 shown in FIG. 4 includes a built-in or external antenna. This antenna forms an electromagnetic field (i.e., an RF field) by emitting a signal. If the RFID tag 300 (as illustrated in FIG. 3) enters this RF field, the RFID tag 300 receives the signal emitted from the antenna of the RFID reader 260, and transmits information stored in the RFID tag 300 to the RFID reader 260 using the energy of the received signal. Then, the RFID reader 260 receives and analyzes the transmitted information, and acquires user identification information stored in the RFID tag 300. The RFID tag 300 and RFID reader 260 will be described in detailed with reference to FIGS. 3 and 4. It is understood that, according to aspects of the present invention, other transmission methods aside from radio frequencies (such as Bluetooth) may be used to transmit user identification information.

The extraction unit 290 extracts the identification information of the computer system 200 and the identification of the hard disk drive 220. Here, the identification information of the computer system 200 refers to the unique information on the computer system 200. An example of the unique information is a product serial number. Likewise, the identification information of a hard disk drive 220 refers to the unique information on the hard disk drive 220, such as a serial number. Other identification information can be related to a network address, user defined information, or other information uniquely corresponding to the system 200 or storage unit 220.

The operation unit 270 executes a predetermined operation on the user-identification information, the computer-system information, and/or the hard-disk-drive identification information, and produces the result value therefrom. For example, the operation unit 270 adds all three sets of identification information, and produces the result value. However, it is understood that the result value may be produced from only one device (such as the system 200), other information extracted from the computer system 200 (such as other peripheral devices like printers or media players), networks or from additionally types of identification information beyond the three.

The determination unit 280 determines whether the boot password and the hard disk password of a computer system 200 have been set. As a result, in the case where the boot password and the hard-disk-drive password of the computer system 200 have not been set, the control unit 250 controls the result value produced by the operation unit 270 to be set as the password for the security of the computer system 200. In the case where the boot password and the hard-disk-drive password have been already set, the determination unit 280 compares the result value produced by the operation unit 270 and the password set in advance.

Where the result value produced by the operation unit 270 and the password set in advance are not the same, the determination unit 280 provides the result of the determination to the main control unit 250 so that the booting of the computer system 200 does not progress. Where the result value produced by the operation unit 270 and the password set in advance are the same, the determination unit 280 allows the booting of the computer system 200 to progress normally. As such, access to the user to data stored in the computer system 200 and the hard disk drive 220 is allowed.

FIG. 3 is a block diagram illustrating the structure of an RFID tag 300, and FIG. 4 is a block diagram illustrating the structure of an RFID reader 260. The RFID tag 300 stores unique information used as user identification information. In the case where the RFID tag 300 enters the RF field, the unique information stored in the memory unit 340 is transmitted to the RFID reader 260. For this, the RFID tag 300 includes an antenna unit 320, a power unit 310, a demodulation unit 350, a modulation unit 360, a control unit 330, and a memory unit 340.

The antenna unit 320 transmits and receives data with the RFID reader 260 using RF signals corresponding to, for example, 100 to 500 KHz low-frequency band, 10 to 15 MHz intermediate-frequency band, and 860 to 960 MHz or 2.45 GHz to 5.8 GHz high-frequency band. The power unit 310 generates power, and supplies the power to the RFID tag 300 so that the information stored in the memory unit 340 of the tag is transmitted to the RFID reader 260. The power unit 310 may be implemented as a separate battery or an LC circuit, depending on the type of the tag. For example, if the RFID tag 300 is an active tag, the power unit 310 can be included in the tag by being implemented as a separate battery. In the case where the RFID tag 300 is a passive tag, the power unit 310 can be implemented as an LC circuit. Here, the power unit 310 generates a predetermined induction voltage (e.g., 3V DC voltage) through the magnetic field generated by the antenna (not shown) of the RFID reader 260, and supplies the voltage to the RFID tag 300.

The demodulation unit 350 demodulates the RF signal received through the antenna unit 320. Further, by detecting a command of the demodulated signal, the demodulation unit 350 allows the control unit 330 to access the memory unit 340.

The modulation unit 360 modulates unique information stored in the memory unit 340 of the RFID tag 300 into RF signals. In other words, unique information is converted from a digital signal into an analog signal. The modulation method may, although not necessarily, be an amplitude shift keying modulation, a frequency shift keying modulation, or a phase shift keying modulation. The converted RF signal is transmitted to the RFID reader 260 through the antenna unit 320.

The memory unit 340 stores the unique information of the tag 300 (e.g., the ID). The memory unit 340 can be implemented as a read-only type, a read and write type, a write once ready many (WORM) type, and others. Furthermore, the memory unit 340 can be implemented as a memory element such as a register, ROM, EPROM, EEPROM, RAM, and ferroelectric random access memory (FRAM), but not limited them.

In the case where the demodulation unit 350 receives the read command from the RFID reader 260, the control unit 330 gets access to the memory unit 340, and reads unique information stored in the memory unit 340. Then, the control unit 330 provides the unique information read from the memory unit 340 to the modulation unit 360, thereby modulating the unique information into analog signals.

While not recognized in all aspects, the RFID tag 300 can include a clock-provision unit (not shown) that provides clocks at regular intervals. The aforementioned RFID tag 300 may be implemented as a sticker type so that a user can attach the tag 300 on a portable item, such as a name card or a mobile phone, and can carry the RFID tag 300.

The RFID reader 260 provides RF energy to the RFID tag 300 so that the RFID reader 260 is activated, and receives the information transmitted from the RFID tag 300. For this, the RFID reader 260 includes an RF-signal-transmission unit 261, an RF-signal-reception unit 262, and a control unit 263, as illustrated in FIG. 4.

The RF-signal-transmission unit 261 includes an antenna circuit, a tuning circuit, and a RF-carrier generator (not shown). The electromagnetic field is formed by continuously emitting electro waves in the antenna circuit, and the tuning circuit tunes so that the antenna shows the highest performance. The RF-signal-transmission unit 261 modulates the base signal into a high-frequency signal, and transmits the signal. Some examples of a predetermined modulation method are amplitude shift keying modulation (ASK Modulation), frequency shift keying modulation (FSK Modulation), and phase shift keying modulation (PSK modulation).

The control unit 263 of the RFID reader 260, which can be implemented as a microcontroller, stores a firmware algorithm. The RFID reader 260 emits the RF signal using this algorithm, and decodes the received signal through the RF-signal-reception unit 262 in order to convert the received signal into the data signal.

Figure 5:
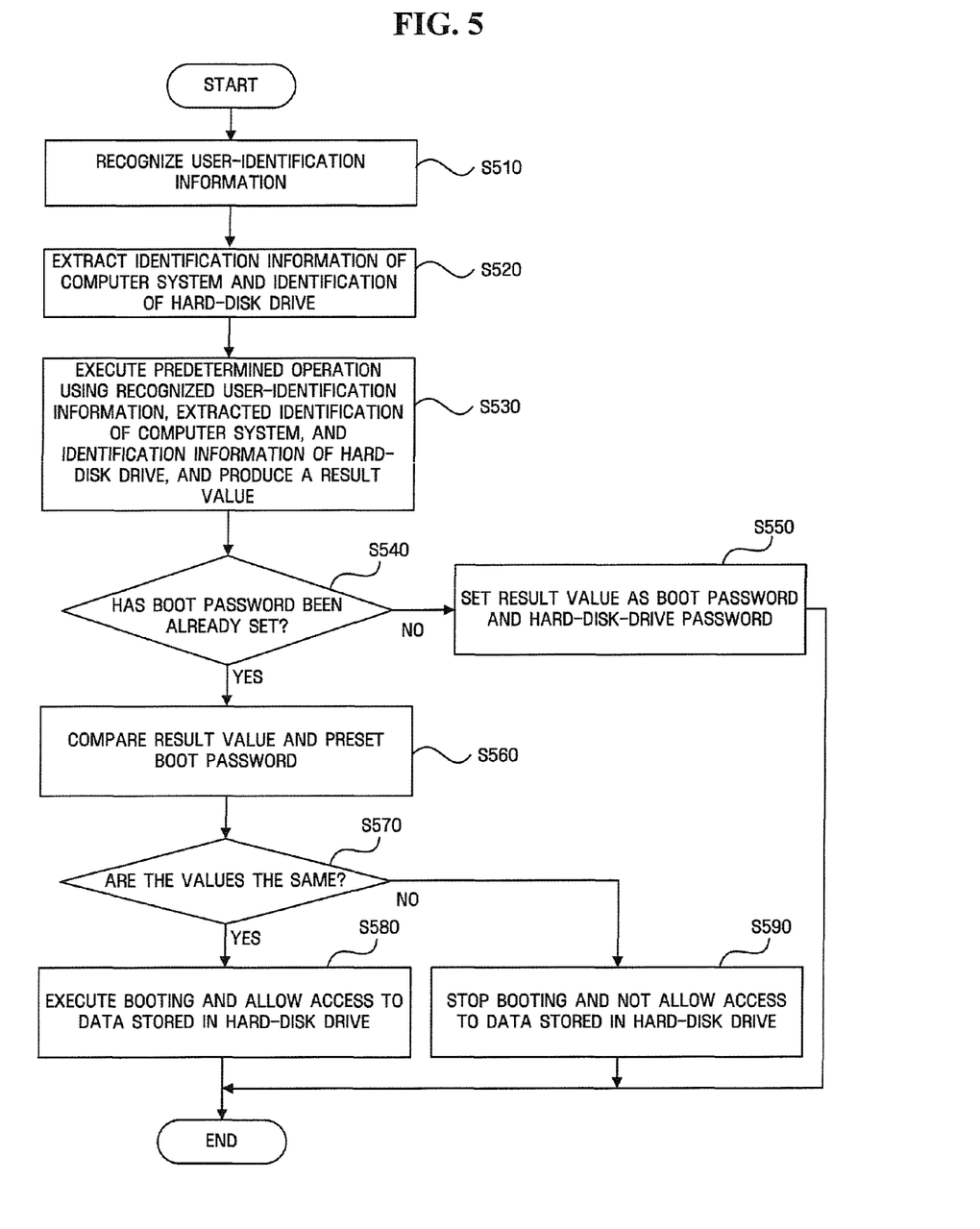
FIG. 5 is a flow chart illustrating a security method of the computer system according to an embodiment of the present invention.

FIG. 5 is a flowchart illustrating a security method of a computer system 200 according to an embodiment of the present invention. First, if the computer system 200 is turned on or operated (such as removed from a standby or hibernate mode), the RFID reader 260 recognizes the identification information of a user from the RFID tag 300 carried by the user in operation S510. Specifically, the RFID reader 260 continually emits the RF signal through an antenna (not shown), and forms an electromagnetic field, i.e., an RF field. Then, the RFID reader 260 transmits a read command to the RFID tag 300 in the RF field.

Further, as the RF field is formed, the RF signal is received through the antenna unit 320 of the RFID tag 300 in the RF field, the induction voltage is generated, and the power is supplied to the RFID tag 300. Then, the demodulation unit 350 demodulates the received RF signal, detects the command signal, and functions according to the type of the detected command signal. For example, in the case where the read command is detected, the detected read command is provided to the control unit 330 so that the memory is accessed. The control unit 330 accesses the memory unit 340, reads the unique information in the digital signal type, and provides the information to the modulation unit 360. The modulation unit 360 modulates the unique information provided by the control unit 330 into an analog signal. Here, an example of a modulation method is amplitude shift keying (ASK), which is a digital modulation method. The signal modulated by the modulation unit 360 is transmitted to the RFID reader 260.

Moreover, the RFID reader 260 demodulates the signal received from the RFID tag 300, and detects the user identification information. Then, the RFID reader may transmit an end command, and terminates the recognition process of the RFID tag 300. The user identification information detected by the RFID reader 260 is provided to the operation unit 270.

Further, if the computer system 200 is turned on or operated, the extraction unit 290 extracts the identification information of the computer system 200 and the identification information of the hard disk drive 220 in operation S520. The extracted identification information is provided to the operation unit 270.

The operation unit 270 produces the result value by performing a predetermined operation using the user identification information, the extracted identification information of the computer system 200, and the identification information of the hard-disk drive (operation S530). For example, the result value is produced by adding all three sets of identification information. However, it is understood that the result value may be produced from only one device (such as the system 200), other information extracted from the computer system 200 (such as other peripheral devices like printers or media players), networks or from additionally types of identification information beyond the three, and can be calculated by other mathematical relationships beyond addition.

Then, the determination unit 280 determines whether the boot password and the hard-disk password have been already set (operation S540). In the case the boot password and the hard-disk-drive password have not been set (no in operation S540), the determination unit 280 sets the result value produced by the operation unit 270 as the boot password and the hard-disk-drive password of the computer system in operation S550. In the case where the boot password and the hard-disk-drive password have been already set (yes in operation S540), the determination unit 280 compares the result value produced by the operation unit 270 and the preset boot password in operation S560.

In the case where the result value produced by the operation unit 270 and the preset boot password are not the same (no in operation S570), the determination unit 280 stops the booting of the computer system 200 in operation S590. In contrast, where the result value produced by the operation unit 270 and the preset boot password are the same (yes in operation S570), the determination unit 280 continues the normal booting of the computer system 200 in operation S580. As such, the user is allowed to access the computer system 200 and the hard disk drive 220.

Figure 6:
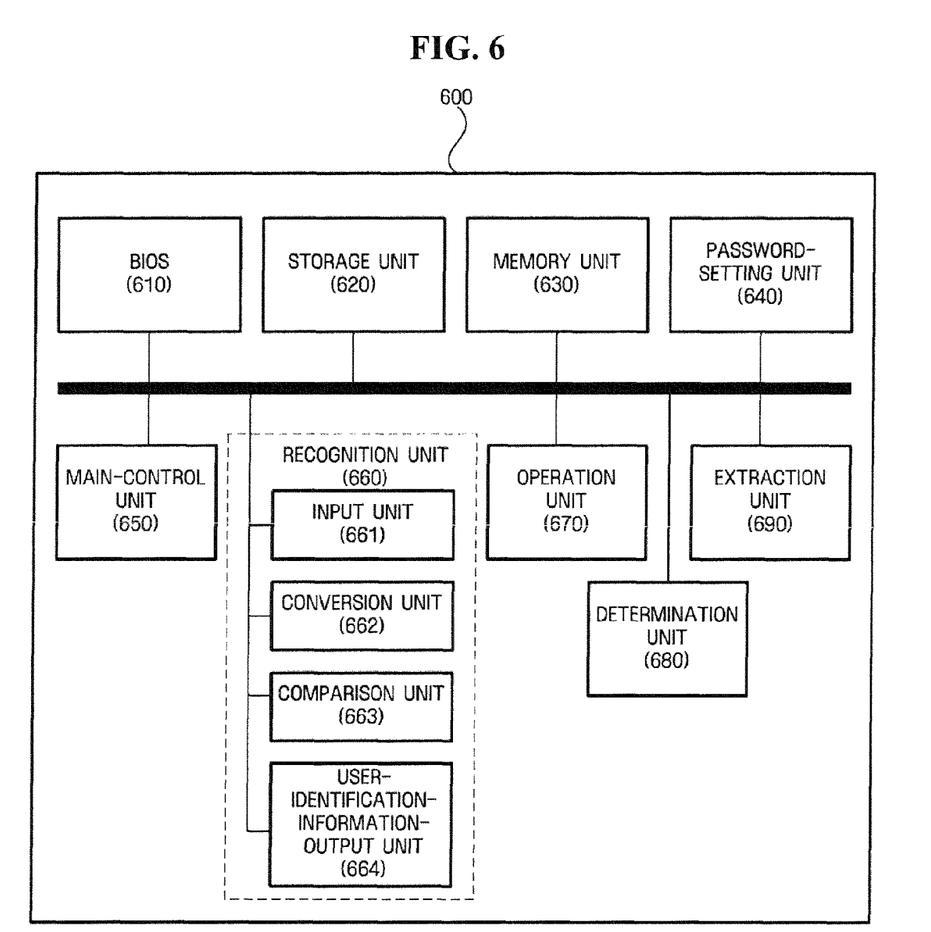
FIG. 6 is a block diagram illustrating the structure of the computer system according to another embodiment of the present invention.

A computer security apparatus and a method according to another embodiment of the present invention will now be described with reference to FIGS. 6 and 7. FIG. 6 is a block diagram illustrating the structure of a computer system 600 having the security function according to another embodiment of the present invention. As illustrated in FIG. 6, the computer system 600 according to another embodiment of the present invention may include the same elements of the computer system 200 described with reference to FIGS. 2-5. However, the computer system 600 according to another embodiment of the present invention includes a recognition unit 660 that outputs the user identification information based on face-recognition technology. However, it is understood that other characteristics could be recognized, such as using a fingerprint-recognition technology, an iris-recognition technology, and/or voice recognition technology. Specifically, the recognition unit 660 includes an input unit 661, a conversion unit 662, a comparison unit 663, and a user identification information output unit 664.

The input unit 661 may include a camera module to take a picture of a user's face. The camera module can be installed in a predetermined position of a computer system 600, thereby acquiring a plane image of the user's face. As another example, the input unit 661 can include at least two or more camera modules, and here, the user's face can be read in three dimensions through the two or more camera modules. It is understood that the input unit may include an eye scanner, a finger print scanner and/or other devices according to the recognition technology that is used. Further, the image can be a still image, or can be a moving image where unique motions are used as the identification information. However, a face recognition technology will be used as an example in the current description. While not required, it is understood that the recognition unit 660 could include a second identification mechanism, such as the RFID reader 260, for additional security.

The conversion unit 662 converts a two-dimensional face image and/or a three-dimensional face image acquired through a camera module into a number. For example, after a face is divided into a predetermined number of sections (e.g., 200 sections), each of the sections are converted into a unique numerical value, respectively. Here, the conversion unit 662 applies weight to a portion where there is a minimum change, a portion that is easily distinguished from others, and others.

The comparison unit 663 compares the numerical values of the converted sections and a preset database, and thus determines whether the agreement rate is more than a predetermined critical value, e.g., 90%. In the case the agreement rate is less than 90%, the comparison unit 663 determines that the current user is not an authorized user. In the case where the agreement rate is more than 90%, the comparison unit 663 determines that the current user is an authorized user. It is understood that, according to aspects of the present invention, methods other than comparing numerical weight values may be used to determine a match between a user's face and a preset database information. Moreover, it is understood that other body features could be used for identification purposes.

The user-identification-information-output unit 664 outputs a value specified as user-identification information according to the result of the determination of the comparison unit 663. For explanatory convenience, it is assumed that the value "5" has been specified as user-identification information on an authorized user. As a result of the determination of the comparison unit 663, if the current user is not an authorized user, the user-identification-information-output unit 664 outputs a value other than "5" (e.g., "0"). If the current user is an authorized user, the user-identification-information-output unit 664 outputs the value "5." The value outputted by the user-identification-information-output unit 664 is provided to the operation unit 670.

Figure 7:
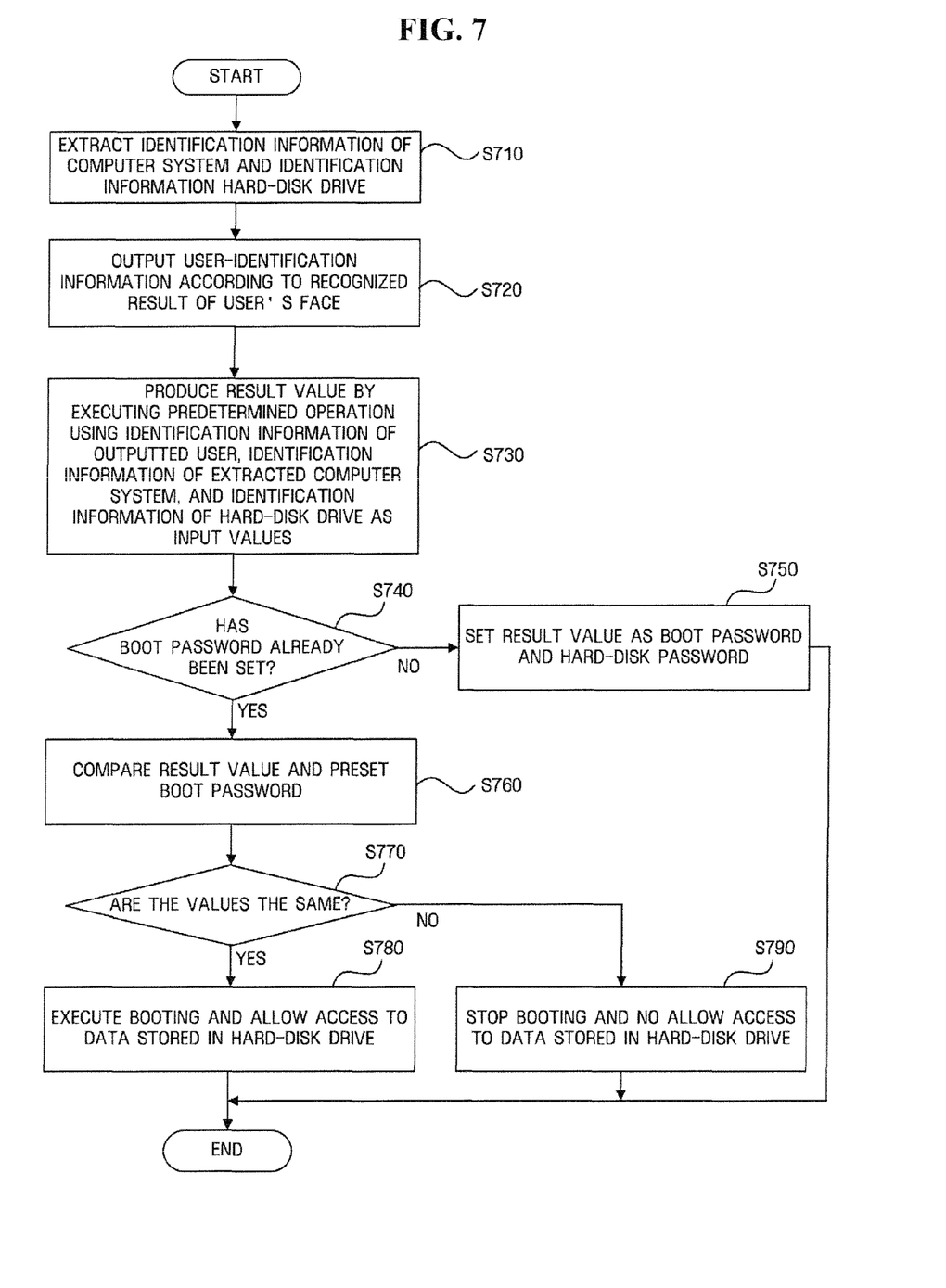
FIG. 7 is a flow chart illustrating a security method of the computer system according to another embodiment of the present invention.

FIG. 7 is a flowchart illustrating a security method of a computer according to the embodiment of the present invention shown in FIG. 6. First, if the computer system 600 is turned on or operated, the extraction unit 690 extracts identification information of the computer system 600 and identification information of a hard disk drive 620 (or storage unit 620), and provides the information to the operation unit 670 in operation S710.

Next, the recognition unit 660 recognizes the user's face, and outputs user-identification information according to the recognition (operation S720). Operation S720 that outputs user-identification information according to the recognition of the user's face is described in detail with reference to FIG. 8. First, the recognition unit 660 receives an input of a two-dimensional image or a three-dimensional image of a user's face through a camera module in operation S721. Then, the recognition unit 660 converts the inputted face image into a numerical value in operation S722. Then, the recognition unit 660 determines whether there is a database storing information to be compared with the converted numerical value in operation S723.

Figure 8:
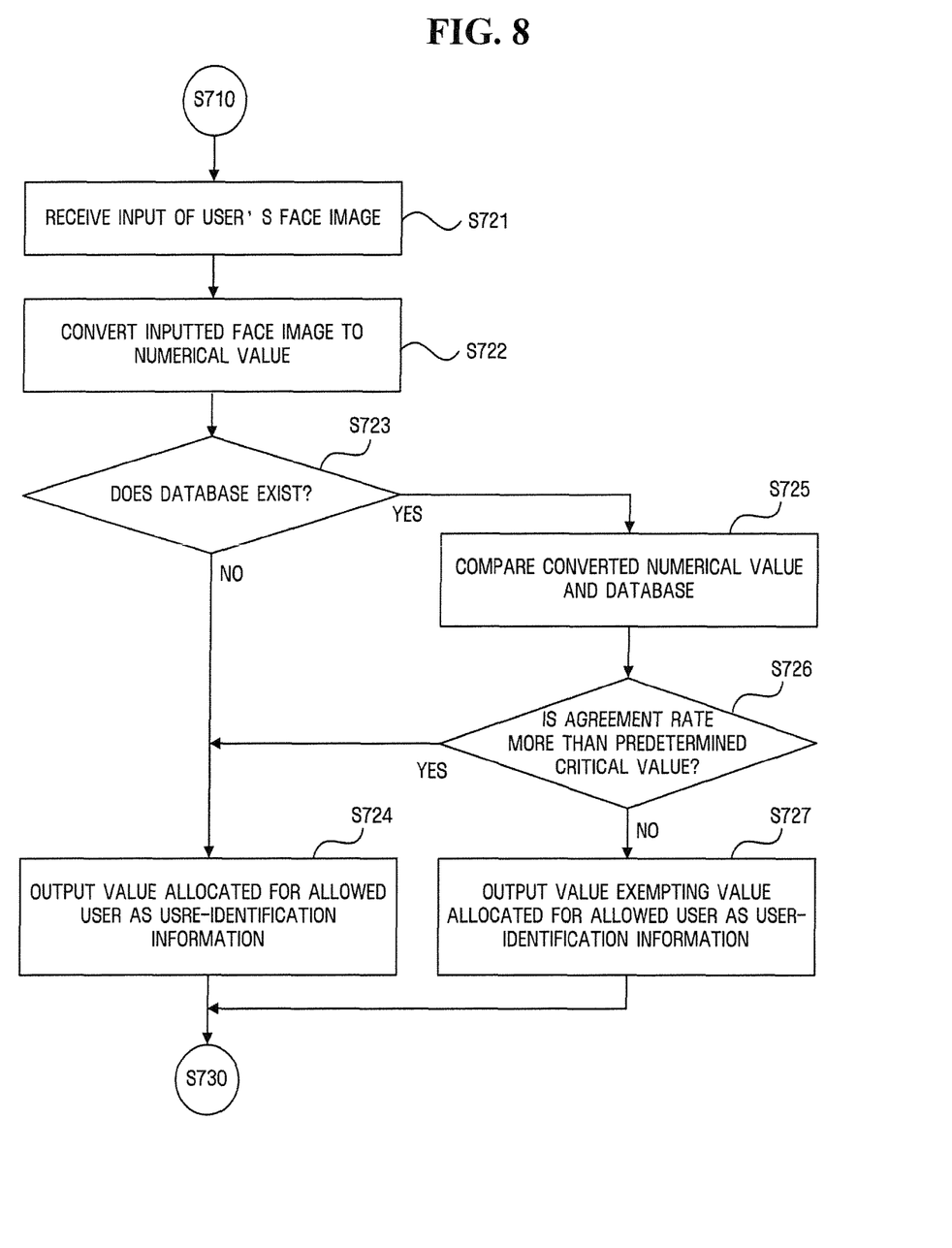
FIG. 8 is a flow chart illustrating an outputting of the user identification information according to the result of the recognition of the user's face as illustrated in FIG. 7.

As a result, in the case where there is no pre-stored database (no in operation S723), the recognition unit 660 outputs the value allocated to an allowed user as user-identification information in operation S724. For example, in the case where the value allocated to the allowed user is 5, the recognition unit 660 outputs 5 as user-identification information. In the case where there is a pre-stored database (yes in operation S723), the recognition unit 660 compares the converted numerical value with information in the pre-stored database (operation S725).

As a result of the comparison, when the agreement rate is less than a predetermined value (e.g., 90%) (no in operation S726), the recognition unit 660 determines that the current user is not an authorized user. Here, the recognition unit 660 outputs a value different than a value allocated to an authorized user as user-identification information (operation S727). For example, in the case where the value allocated to the authorized user is 5, the recognition unit 660 outputs 0 as user-identification information. In contrast when the agreement rate is 90% or more (yes in operation S726), the recognition unit 660 determines that the current user is an authorized user. Here, the recognition unit outputs the value allocated to the authorized user as user-identification unit in operation S724.

Referring to FIG. 7, the operation unit 670 executes a predetermined operation using user-identification information outputted from the recognition unit 660, identification information of a computer system 600, and identification information of a hard-disk drive extracted from the extraction unit 690 as input values, and produces a result value therefrom in operation S730.

Then, the determination unit 680 determines whether a boot password and a hard-disk-drive password of a computer system 600 have been set in operation S740. In the case where the boot password and the hard-disk-drive password have not been set (no in operation S740), the determination unit 680 sets the result value produced by the operation unit 670 as the boot password and the hard-disk-drive password of the computer system 600 in operation S750. As a result of the determination, in the case where the boot password and the hard-disk-drive password have been already set (yes in operation S740), the determination unit 680 compares the result value produced by the operation unit 670 and the boot password of the preset computer system 600 in operation S760.

When the result value produced by the operation unit 670 and the preset boot password are not the same (no in operation S770), the determination unit 680 stops the booting of the computer system 600 in operation S790. At the same time, the determination unit 680 does not allow access to data stored in the hard-disk drive (or storage unit 620). When the result value produced by the operation unit 670 and the preset boot password are not the same (yes in operation S770), the determination unit 680 allows the normal booting of the computer system 600 to continue in operation S780. As such, access to the computer system 600 and the hard-disk drive (or storage unit 620) is allowed to the user.

According to aspects of the present invention, when a computer system is stolen, even though an existing hard-disk drive is changed into a new one, the unauthorized user cannot use the computer system. Furthermore, even if the existing hard-disk drive is connected to another computer system, the user cannot access data stored in the hard-disk drive. Hence, the computer system and the hard disk drive can be protected at the same time. Moreover, according to aspects of the present invention, a user does not need to manually input the password every time a computer system 200 or 600 is booted.

While described in the context of a computer, it is understood that aspects of the invention can be implemented in other devices, such as portable media players, phones, personal digital assistants, and other personal computing devices with or without detachable storage media.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A security apparatus for a computer system, the security apparatus comprising:
   a recognition unit to recognize identification information of a user;
   an operation unit to produce a result value by executing a predetermined operation on the identification information of the user, unique identification information of the computer system and unique identification information of at least one peripheral device of the computer system; and a main control unit to execute a booting of the computer system according to whether a preset password of the computer system and the result value are the same.

2. The apparatus as claimed in claim 1, wherein the unique identification information of the computer system is a serial number of the computer system.

3. The apparatus as claimed in claim 1, wherein the unique identification information of the at least one peripheral device is a serial number of the at least one peripheral device.

4. The apparatus as claimed in claim 1, wherein the at least one peripheral device is a hard disk drive.

5. The apparatus as claimed in claim 1, further comprising a radio frequency identification (RFID) tag to store the identification information of the user.

6. The apparatus as claimed in claim 5, wherein the recognition unit comprises an RFID reader to receive the identification information of the user from the RFID tag.

7. The apparatus as claimed in claim 6, wherein the RFID reader comprises:
an RF signal transmission unit to transmit a command to the RFID tag to transmit the identification information of the user, and to form an electromagnetic field such that when the RFID tag enters the electromagnetic field, the RFID tag receives the command.

8. The apparatus as claimed in claim 1, wherein the identification information of the user is physical identification information of the user.

9. The apparatus as claimed in claim 8, wherein the recognition unit comprises:
an input unit to receive the physical identification information of the user; and
a comparison unit to determine whether the user is an allowed user according to whether an agreement rate between the inputted physical identification information and pre-stored physical identification information is greater than a predetermined critical value.

10. The apparatus as claimed in claim 9, wherein the recognition unit further comprises a user-identification-information-output unit to output a first value indicating that the agreement rate is greater than the predetermined critical value, and a second value indicating that the agreement rate is less than the predetermined critical value.

11. The apparatus as claimed in claim 1, further comprising:
a determination unit to determine whether a boot password of the computer system and/or a password of a peripheral device have been set; and
a password-setting unit to set the result value as the boot password of the computer system and/or the password of the peripheral device when the boot password of the computer system and/or the password of the peripheral device have not been set.

12. The apparatus as claimed in claim 1, wherein the main control unit allows access to a peripheral device if a preset password of the peripheral device and the result value are the same.

13. A security method for a computer system, the method comprising:
recognizing, by a security apparatus, identification information of a user;
producing a result value by executing, in the security apparatus, a predetermined operation on the identification information of the user, unique identification information of the computer system, and unique identification information of at least one peripheral device of the computer system; and
executing a booting of the computer system according to whether a preset password of the computer system and the result value are the same.

14. The method as claimed in claim 13, wherein the unique identification information of the computer system is a serial number of the computer system.

15. The method as claimed in claim 13, wherein the unique identification information of the at least one peripheral device is a serial number of the at least one peripheral device.

16. The method as claimed in claim 13, wherein the at least one peripheral device is a hard disk drive.

17. The method as claimed in claim 13, wherein the identification information of the user is stored in an RFID tag.

18. The method as claimed in claim 17, wherein the recognizing of the identification information of the user comprises:
receiving the identification information of the user from the RFID tag through an RFID reader.

19. The method as claimed in claim 18, wherein the receiving of the identification information of the user comprises:
transmitting a command to the RFID tag to transmit the identification information of the user; and
forming an electromagnetic field such that when the RFID tag enters the electromagnetic field, the RFID tag receives the command.

20. The method as claimed in claim 13, wherein the identification information of the user is physical identification information of the user.

21. The method as claimed in claim 20, wherein the recognizing of the identification information of the user comprises:
receiving an input of the physical identification information of the user; and
determining whether the user is an allowed user according to whether an agreement rate between the physical identification information and pre-stored physical identification information is greater than a predetermined critical value.

22. The method as claimed in claim 21, wherein the recognizing of the identification information of the user further comprises:
outputting a first value when the agreement rate is greater than the predetermined critical value; and
outputting a second value when the agreement rate is less than the predetermined critical value.

23. The method as claimed in claim 13, wherein the producing of the result value comprises:
determining whether a boot password of the computer system and/or a password of a peripheral device have been set; and
setting the result value as the boot password of the computer system and/or the password of the peripheral device when the boot password of the computer system and/or the password of the peripheral device have not been set.

24. The method as claimed in claim 13, further comprising:
allowing access to a peripheral device if a preset password of the peripheral device and the result value are the same.

25. A security apparatus for a computer system, the security apparatus comprising:
an identification capture unit to capture from a foreign object identification information of a user;
an operation unit to produce a result value by executing a predetermined operation on the captured identification information of the user and unique identification information of at least one peripheral device of the computer system; and a main control unit to determine whether the user is an allowed user according to whether a preset password and the result value are the same.

26. The apparatus as claimed in claim 25, wherein the other value is unique identification information of the computer system.

27. The apparatus as claimed in claim 25, wherein the main control unit executes a booting of the computer system if the main control unit determines that the user is the allowed user.

28. The apparatus as claimed in claim 25, wherein the main control unit allows access to the peripheral device if the main control unit determines that the user is the allowed user.

29. The apparatus as claimed in claim 25, wherein the foreign object comprises an RFID tag storing the identification information and the identification capture unit comprises an RFID reader to receive the identification information of the user from the RFID tag.

30. The apparatus as claimed in claim 25, wherein the identification information of the user is physical identification information of the user.

31. The apparatus as claimed in claim 30, wherein the identification capture unit comprises:

an input unit to receive the physical identification information of the user; and a comparison unit to determine whether the user is the allowed user according to whether an agreement rate between the inputted physical identification information and pre-stored physical identification information is greater than a predetermined critical value.

32. A security method for a computer system, the method comprising:

capturing, by a security apparatus, identification information of a user from a foreign object;

producing a result value by executing, in the security apparatus, a predetermined operation on the identification information of the user and unique identification information of at least one peripheral device of the computer system; and determining, by the security apparatus, whether the user is an allowed user according to whether a preset password and the result value are the same.

33. The method as claimed in claim 32, further comprising: executing a booting of the computer system if the user is determined to be the allowed user.

34. The method as claimed in claim 32, further comprising: allowing access to the peripheral device if the user is determined to be the allowed user.

35. The method as claimed in claim 32, wherein the capturing of the identification information of the user comprises: receiving the identification information of the user from an RFID tag.

36. The method as claimed in claim 32, wherein the identification information of the user is physical identification information of the user.

\* \* \* \* \*